May 19, 1931.  H. F. KOEPF  1,806,105
SLICING MACHINE
Filed Oct. 8 1928   2 Sheets-Sheet 1
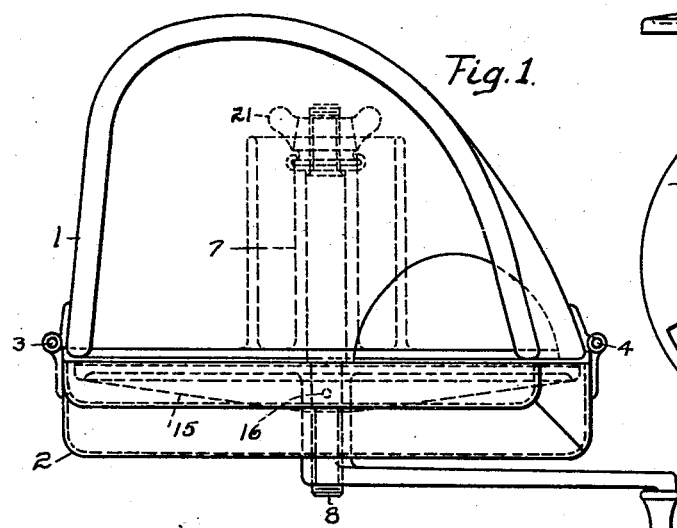
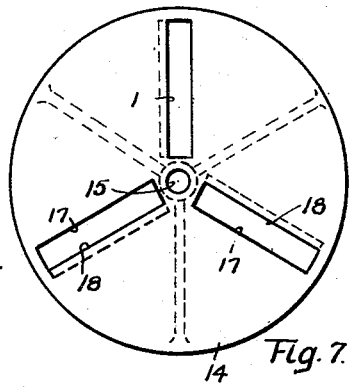
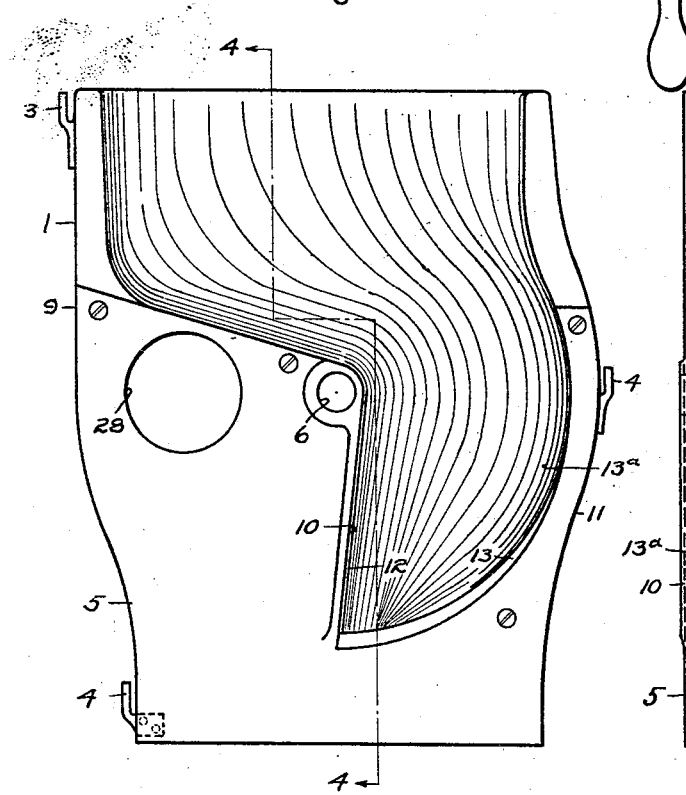
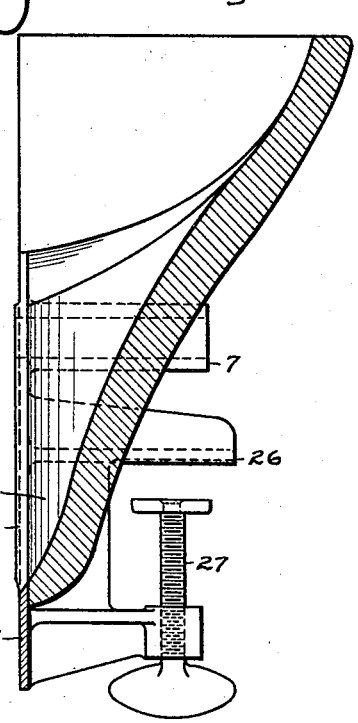
INVENTOR.
H. F. Koepf
BY
ATTORNEY.

May 19, 1931.  H. F. KOEPF  1,806,105
SLICING MACHINE
Filed Oct. 8 1928  2 Sheets-Sheet 2
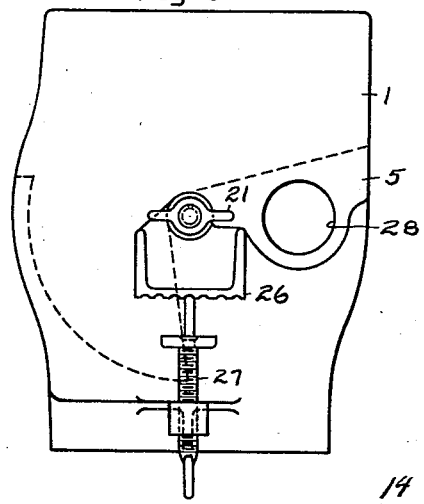
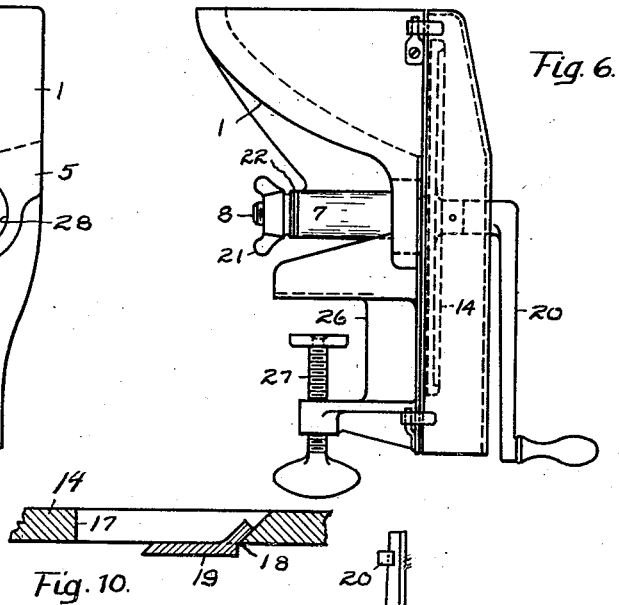
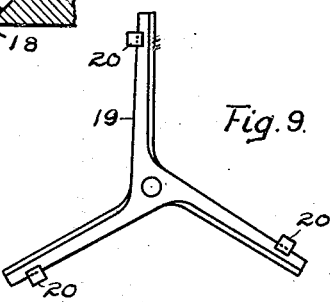
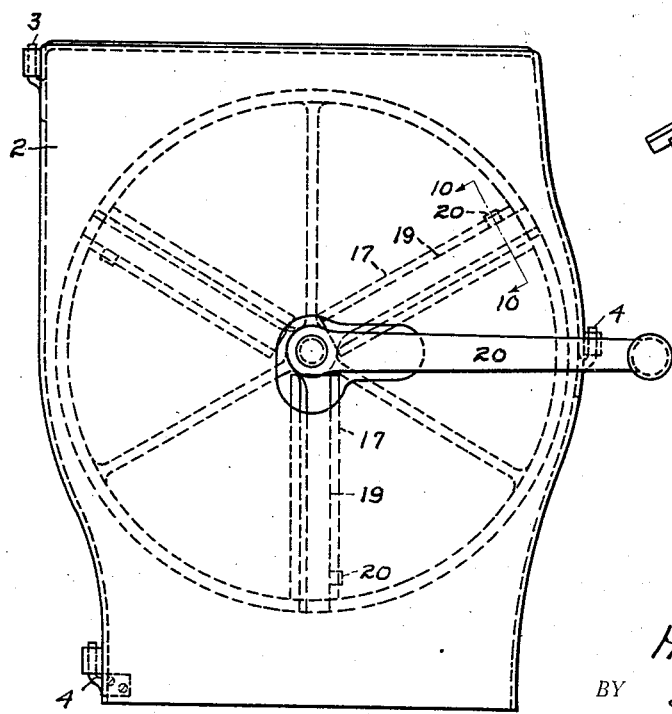
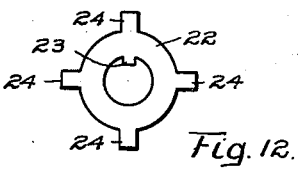
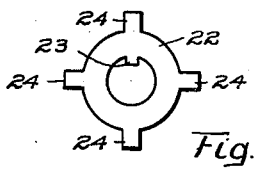
INVENTOR.
H. F. Koepf
BY
ATTORNEY.

Patented May 19, 1931

1,806,105

UNITED STATES PATENT OFFICE

HENRY F. KOEPF, OF FORT WAYNE, INDIANA

SLICING MACHINE

Application filed October 8, 1928. Serial No. 311,057.

The invention relates to machines for slicing various food products, especially vegetables.

The object of the invention is to provide a novel, sanitary and simple machine which effectively slices or cuts various articles fed to it and in which the products are fed to the cutting mechanism in novel manner. Other objects and advantages will be set forth hereinafter.

The invention is illustrated in the accompanying drawings, in which

Figure 1 is a plan view of a machine embodying the invention; Fig. 2 is a front elevational view of the machine; Fig. 3 a front elevational view of the same, the front cover and the cutting member being removed; Fig. 4 a cross-section on line 4—4 of Fig. 3; Fig. 5 a rear elevational view of the machine; Fig. 6 a side elevational view of the same; Fig. 7 a plan view of the cutting member; Fig. 8 an edge view of the same; Fig. 9 a plan view of the spider that drives the cutting member; Fig. 10 a cross-section on line 10—10 of Fig. 2 illustrating the engagement of the cutting member and driving spider; Fig. 11 an elevational view of the lock washer and thumb nut for the shaft and Fig. 12 a plan view of the lock washer.

Referring to the illustrative embodiment of the invention, 1 is the hopper formed of suitable material that is readily cleaned. The top and the upper portion of the front side of the hopper are open, the said open side being closed by the open bottom cover 2 that is removably engaged on the hook or pin 3 projecting from the wall of the hopper and on the hooks or pins 4 projecting from the opposite side edges of the frame 5 that is secured to the front edge of the hopper 1. The frame 5 and the hopper could be formed in one piece depending on the nature of the material used for the hopper.

The frame 5 is apertured at 6 and a bearing 7 is formed on the rear side of the frame to support the shaft 8 of the cutting mechanism, the shaft being passed through the aperture 6. The top of the frame adjacent to and above the aperture 6 slopes upwardly toward one side edge 9 of the frame and a downwardly tapering feed opening 10 is formed in the frame between said aperture 6 and the opposite side 11 of the frame. The inner wall 12 of the opening 10 slopes away from the opposite wall 13 thereof and the wall 13 curves inwardly from the top of the frame to join with the lower end of the wall 12 of the feed opening 10.

The hopper is preferably semi-elliptical in its lower portion, the inner surface of the wall of the hopper curving and sloping toward the opening 10 in the frame as shown in Figs. 3 and 4, and forming a downwardly tapering chamber 13$^a$ behind said opening. The portion of the hopper above the chamber 13$^a$, therefore, flares laterally, rearwardly and upwardly from said chamber so that when articles to be chopped up or sliced are inserted into the hopper they descend by gravity into the chamber 13$^a$.

The cutting mechanism consists of a disk 14 having a central opening 15 therein adapted to receive the forward end of the shaft 8 to which the disk is secured by a set screw 16. A suitable number of openings 17 is formed in the disk, corresponding walls 18 of the opening being bevelled. The openings 17 may have any selected form or size. In practice various forms of apertured cutting members will be made to accomplish the work to be done. Between the disk 14 and the openings 10 is a spider 19 that is loosely mounted on the shaft 8. A lug 20 is formed on each arm of the spider and engages the sloping wall 18 of one of the slots 17. The edge 20$^a$ of each arm opposite the lug 20 is sharpened and forms a knife. Various thicknesses of knives will be used in accordance with the thicknesses of the slices desired, it being evident that the spacing of the cutting edges 20$^a$ from the disk 14 (Fig. 10) controls the thickness of the slice that is cut. The spider rides on the front face of the frame 5 and it and the disk travel clockwise over the feed opening 10 when the shaft 8 is rotated and engage the articles that are exposed at said opening, the cutting edges slicing off portions of the articles which portions pass through the slots 17 and drop downwardly within the cover and out through the open lower end thereof.

A crank 20ᵇ is attached to the forward end of the shaft 8 and the shaft is held against longitudinal movement by the thumb nut 21 that carries a washer 22. This washer is formed with an inner lug 23 that engages in a longitudinal slot 24 formed in the rear end of the shaft 8. Outer lugs 25 on the washer are bent over a bead 21ᵃ formed on the nut 21 so that the washer is loosely retained on the nut. By tightening the nut against the end of the bearing 7 the spider and disk are drawn toward the frame 5 with such firmness as may be desired.

A jaw 26 is formed on the rear side of the frame, the lower arm of which carries a screw 27 by which the device may be attached to a table or other fixture.

An aperture 28 of suitable size is formed in the frame 5 below the expanded upper portion of the hopper and at one side of the feed opening 10, and is so located that the revolving cutting mechanism will pass over it. Certain articles, such as a carrot or cucumber, may be fed endwise through the opening 28 from the rear side of the device, the cutting mechanism slicing the article.

Due to the peculiar form of the hopper the materials to be cut or sliced, when fed into the hopper, move by gravity toward the feed opening 10, aided more or less by the downward movement of the cutting edges or blades over the feed opening. The articles fed to the device are rapidly and entirely sliced or cut-up and the sliced or cut-up particles are readily collected in a suitable receptacle placed beneath the cover 2.

What I claim is:

In a slicing machine, a frame, a hopper on the frame, the frame having an opening coincident with the hopper, a shaft revolubly mounted on the frame and cutting means on the shaft comprising a radially slotted disk secured to the shaft and a spider loosely mounted on the shaft having one edge of each arm of the spider sharpened and adapted to extend into the slots in the disk and each arm having a lug adapted to engage one wall of a slot.

In witness whereof I have hereunto set my hand this 29th day of Sept., 1928.

HENRY F. KOEPF.